US006864912B1

United States Patent
Mahaffey et al.

(10) Patent No.: US 6,864,912 B1
(45) Date of Patent: Mar. 8, 2005

(54) COMPUTER SYSTEM PROVIDING HANDS FREE USER INPUT VIA OPTICAL MEANS FOR NAVIGATION OR ZOOMING

(75) Inventors: Robert B. Mahaffey, Austin, TX (US); Lawrence F. Weiss, Round Rock, TX (US); Richard S. Schwerdtfeger, Round Rock, TX (US); Frederik C. Kjeldsen, Poughkeepsie, NY (US)

(73) Assignee: International Business Machines Corp., Armonk, NY (US)

( * ) Notice: Subject to any disclaimer, the term of this patent is extended or adjusted under 35 U.S.C. 154(b) by 592 days.

(21) Appl. No.: 09/464,841

(22) Filed: Dec. 16, 1999

(51) Int. Cl.[7] .................................................. H04N 7/18
(52) U.S. Cl. ..................... 348/61; 348/63; 348/14.01
(58) Field of Search ................ 348/39, 42, 46–53, 348/62–63, 61, 78, 135, 14.01, 14.28, 14.1; 347/7–8, 9; 455/3.05, 3.06

(56) References Cited

U.S. PATENT DOCUMENTS

| | | | |
|---|---|---|---|
| 5,359,362 A | * 10/1994 | Lewis et al. ................... | 348/15 |
| 5,675,374 A | * 10/1997 | Kohda .......................... | 348/15 |
| 5,675,376 A | * 10/1997 | Andersson et al. ............ | 348/20 |
| 5,742,264 A | 4/1998 | Inagaki et al. .................. | 345/8 |
| 5,781,913 A | 7/1998 | Felsenstein et al. ........ | 345/169 |
| 5,815,197 A | * 9/1998 | Kakii ........................... | 348/20 |
| 5,839,000 A | 11/1998 | Davis, Jr. et al. ............. | 396/51 |
| 5,844,544 A | * 12/1998 | Kahn et al. ................... | 345/156 |
| 5,905,525 A | 5/1999 | Ishibashi et al. ............... | 348/39 |
| 5,911,036 A | 6/1999 | Wright et al. ................ | 700/259 |
| 5,917,460 A | 6/1999 | Kodama ...................... | 345/157 |
| 6,259,470 B1 | * 7/2001 | Koizumi et al. ........... | 348/14.1 |

* cited by examiner

Primary Examiner—Vu Le
(74) Attorney, Agent, or Firm—Kevin L. Daffer; Conley Rose P.C.; Marilyn S. Dawkins

(57) ABSTRACT

A system and method are described for selectively providing display data to a display device dependent upon an optically detected proximity of a user's face to a camera. One embodiment of a computer system includes the camera, the display device, and a processing system. The camera produces image signals representing a first image and a second image of the user's face, wherein the first image precedes the second image in time. The processing system receives the image signals and analyzes the first and second images to determine the proximity of the user's face to the camera. More specifically, the processing system compares the first and second images to determine the proximity of the user's face to the camera in the second image relative to the proximity of the user's face in the first image. The processing system provides the display data to the display device dependent upon the proximity of the user's face to the camera. In order to determine the proximity of the user's face to the camera, the processing system may compare: (i) a size of the user's face in the first and second images, and/or (ii) a distance between selected facial features of the user in the first and second images. The processing system may provide more of the display data to the display device when the user's face is closer to the camera, and may provide less of the display data to the display device when the user's face is farther from the camera.

10 Claims, 6 Drawing Sheets

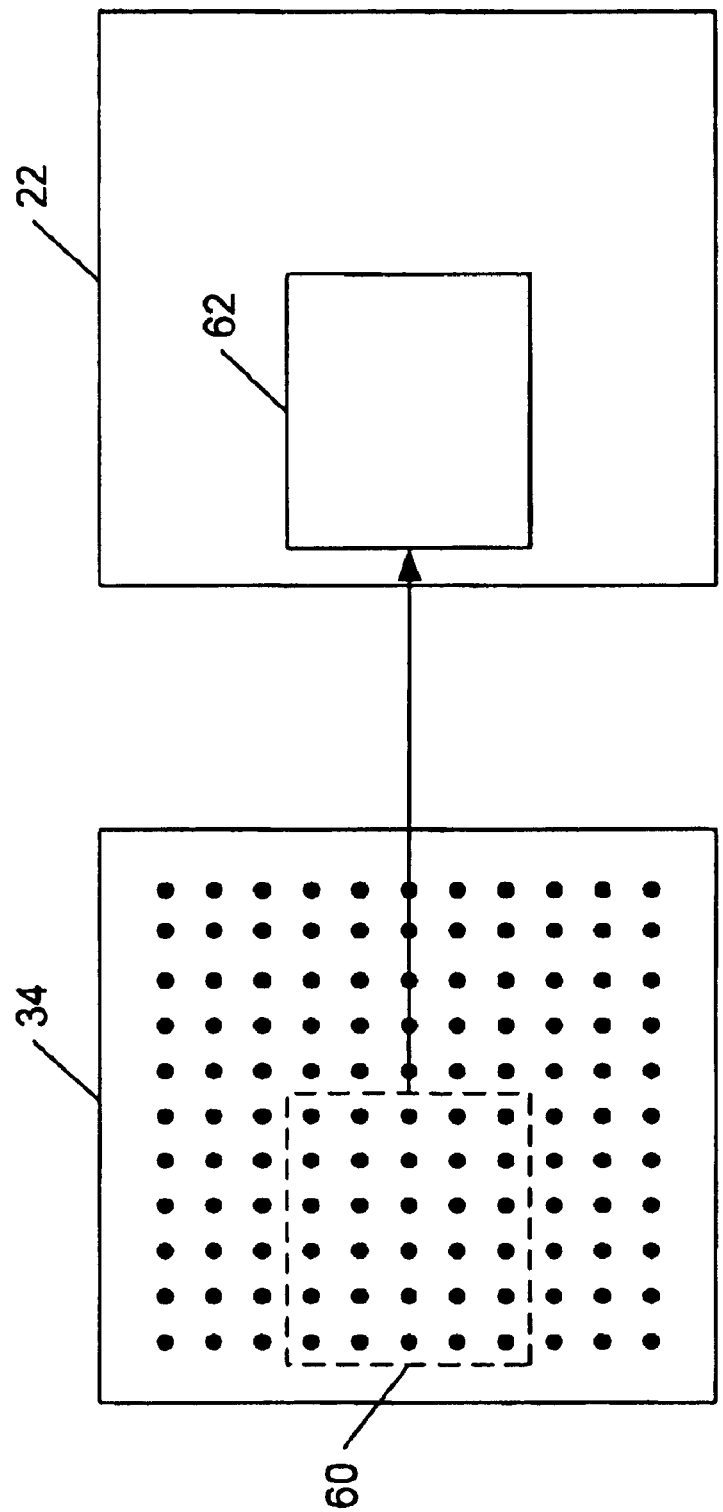

COMPUTER SYSTEM PROVIDING HANDS FREE USER INPUT VIA OPTICAL MEANS FOR NAVIGATION OR ZOOMING

BACKGROUND OF THE INVENTION

1. Field of the Invention

This invention relates to display systems, and more particularly to computer display systems performing navigation or zooming (i.e., magnification) in response to user input.

2. Description of Related Art

Several different types of input devices allow for controlling a displayed image based upon manual user input. Examples of such input devices include conventional keyboards and pointing devices such as a mouse. Most input devices require a certain degree of manual dexterity. Physically challenged users (e.g., users without hands, or with permanent or temporary loss of motor skills) may have difficulty operating keyboards and conventional pointing devices.

A user may also be "situationally" challenged by virtue of simultaneously performing another task. Examples of situationally challenged users include a doctor operating on a patient and someone driving a car or operating machinery.

Other known types of input devices allowing hands free control of a displayed image include speech-to-text converters. Various types of head tracking technologies also exist for controlling displayed images dependent upon movement of a user's head.

"Zooming" is the term generally used to describe magnification of a portion of display data (e.g., an image). To "zoom in" is to increase magnification, and to "zoom out" is to decrease magnification. It would be desirable to have an alternate system and method providing hands free control of a displayed image, especially for zooming.

SUMMARY OF THE INVENTION

A system and method are described for selectively providing display data to a display device (e.g., a display terminal) dependent upon an optically detected proximity of a user's face to a camera. One embodiment of a computer system includes the camera, the display device, and a processing system. The camera produces image signals representing a first image and a second image of the user's face, wherein the first image precedes the second image in time. The processing system receives the image signals and analyzes the first and second images to determine the proximity of the user's face to the camera. More specifically, the processing system compares the first and second images to determine the proximity of the user's face to the camera in the second image relative to the proximity of the user's face to the camera in the first image. The processing system provides the display data to the display device dependent upon the proximity of the user's face to the camera.

The processing system may analyze the first and second images by comparing a size of the user's face in the second image to the size of the user's face in the first image. If the size of the user's face in the second image is greater than the size of the user's face in the first image, the user's face is closer to the camera. On the other hand, the user's face is farther from the camera if the size of the user's face in the second image is less than the size of the user's face in the first image.

Alternately, the processing system may analyze the first and second images by comparing a first distance between selected facial features of the user in the first image to a second distance between the selected facial features in the second image. The selected facial features may be, for example, the user's eyes, cheeks, ears, or corners of the mouth. If the second distance is greater than the first distance, the user's face is closer to the camera. On the other hand, the user's face is farther from the camera if the second distance is less than the first distance.

The processing system may provide more of the display data to the display device when the user's face is closer to the camera, and may provide less of the display data to the display device when the user's face is farther from the camera.

The first image may be a "normal" image of the user's face when the user is operating the computer system in a normal upright sitting position. Alternately, the first image may be a "previous" image immediately preceding the second image.

A method for displaying data includes determining the proximity of a user's face to a camera. A portion of the data is displayed, wherein the size of the portion is dependent upon the proximity of the user's face to the camera. The determining step may be carried out using one of the methods described above. For example, the determining step may include using the camera to form the above first image and second images. In one case, the size of the user's face in the second image may be compared to the size of the user's face in the first image as described above in order to determine the proximity of the user's face to the camera. Alternately, the first and second distances between selected facial features of the user in the first and second images may be compared as described above in order to determine the proximity of the user's face to the camera.

BRIEF DESCRIPTION OF THE DRAWINGS

Other objects and advantages of the invention will become apparent upon reading the following detailed description and upon reference to the accompanying drawings in which:

FIG. 6 is a diagram representing a hands free "zooming" method wherein the display data is a bit-mapped image file, and wherein a portion of the display data is selected for display within a display area of a display screen of the display terminal, and wherein the size of the portion is determined by the proximity of the user's face to the opening of the camera.

Figure 1:
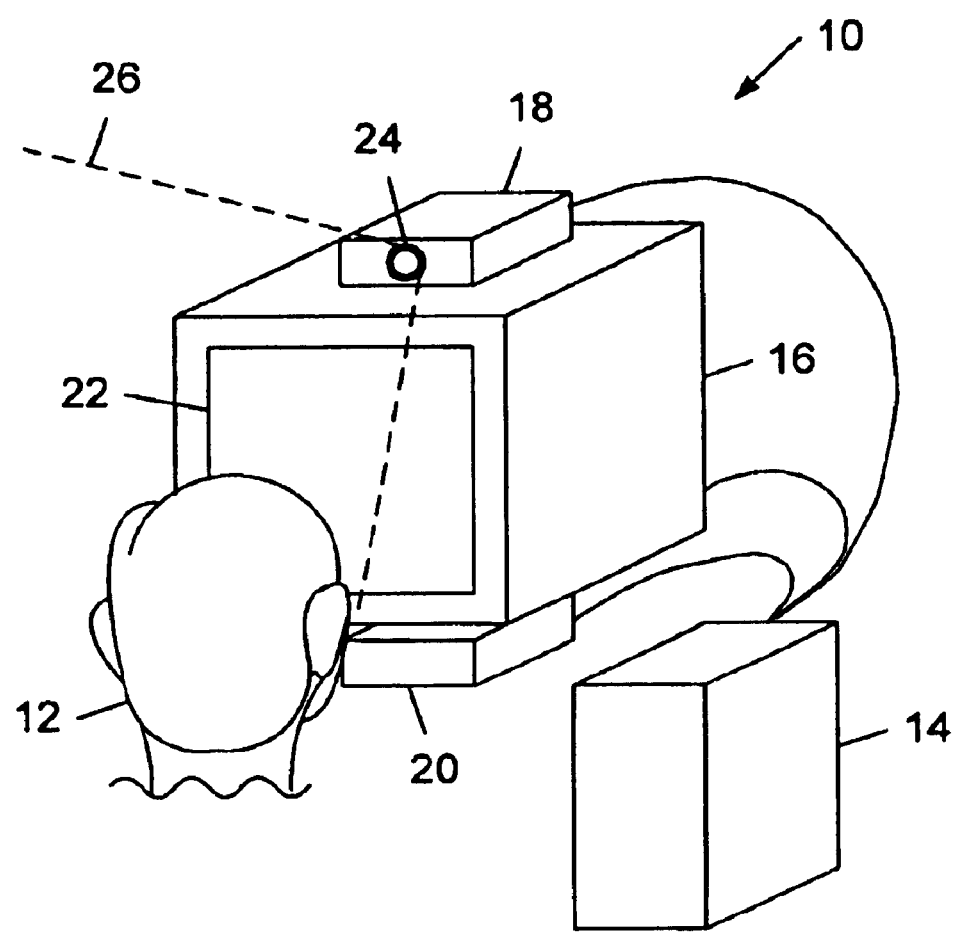
FIG. 1 is a perspective view of one embodiment of a computer system providing hands free user input via optical means for navigation or "zooming", wherein the computer system includes a housing coupled to a display terminal and a camera.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

FIG. 1 is a perspective view of one embodiment of a computer system 10 providing hands free user input via optical means for navigation and/or "zooming". FIG. 1 is a view of computer system 10 from behind a user's head 12. In the embodiment of FIG. 1, computer system 10 includes a housing 14 coupled to a display terminal 16, a camera 18, and an input device 20.

Display terminal 16 includes a display screen 22. During use of computer system 10, the user's eyes are typically directed toward display screen 22 in order to view information displayed upon display screen 22. As such, the user's face is oriented toward display screen 22. A light-gathering opening 24 of camera 18 is directed such that the user's face is within a field of view 26 of camera 18. A lens may be positioned in front of opening 24 for focusing light entering opening 24. Camera 18 converts light entering opening 24 from field of view 26, including light reflected from the user's face, into electrical image signals.

Figure 2:
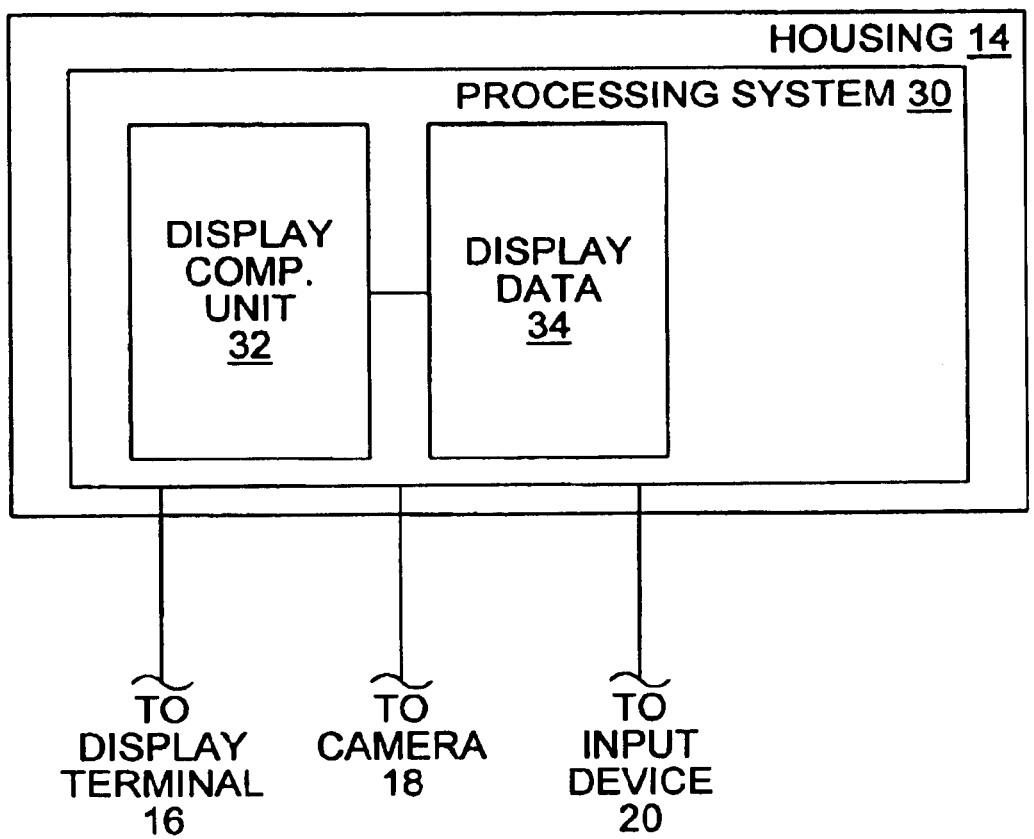
FIG. 2 is a block diagram of one embodiment of the housing of FIG. 1, wherein the housing includes a processing system coupled to the display terminal and the camera, and wherein the processing system includes a display computation unit coupled to display data, and wherein the display data may be, for example, hierarchical data or a bit-mapped image file.

FIG. 2 is a block diagram of one embodiment of housing 14 of FIG. 1. In the embodiment of FIG. 2, housing 14 houses a processing system 30 coupled to display terminal 16, camera 18, and input device 20. Processing system 30 may be, for example, a computing system including a central processing unit (CPU) coupled to a memory system. The memory system may include semiconductor memory, one or more fixed media disk drives, and/or one or more removable media disk drives. Camera 18 provides the electrical image signals to processing system 30.

Processing system 30 receives user input via input device 20. Input device 20 is preferably a speech-to text converter, allowing hands free user input. Alternately, input device 20 may be a pointing device such as a mouse, or a computer keyboard.

In the embodiment of FIG. 2, processing system 30 within housing 14 includes a display computation unit 32 coupled to display data 34. Display data 34 may be stored in the memory system of processing system 30. Display data 34 may be, for example, hierarchical data, a bit-mapped image file, continuous data, or consecutive data. Each of these different types of data will be described in more detail below.

In general, display computation unit 32 receives electrical image signals produced by camera 18 and processes the electrical image signals to form images. Display computation unit 32 analyzes the images in order to determine the proximity of the user's face to opening 24 of camera 18. Display computation unit 32 produces display signals dependent upon the proximity of the user's face to opening 24 of camera 18. Processing system 30 provides the display signals to display terminal 16. Display computation unit 32 may be implemented in hardware, software, or a combination of hardware and software.

Hierarchical Data

Display data 34 may, for example, represent a hierarchical structure or "entity". Exemplary hierarchical entities include:

1) a file system organized as directories, wherein each directory may contain files and/or subdirectories, 2) a graphical user interface (GUI) organized as folders, wherein each folder may contain files and/or subfolders, 3) an electronic document (e.g. a Web page), and 4) a map organized as sections, wherein each section includes additional detail and/or subsections.

Figure 3:
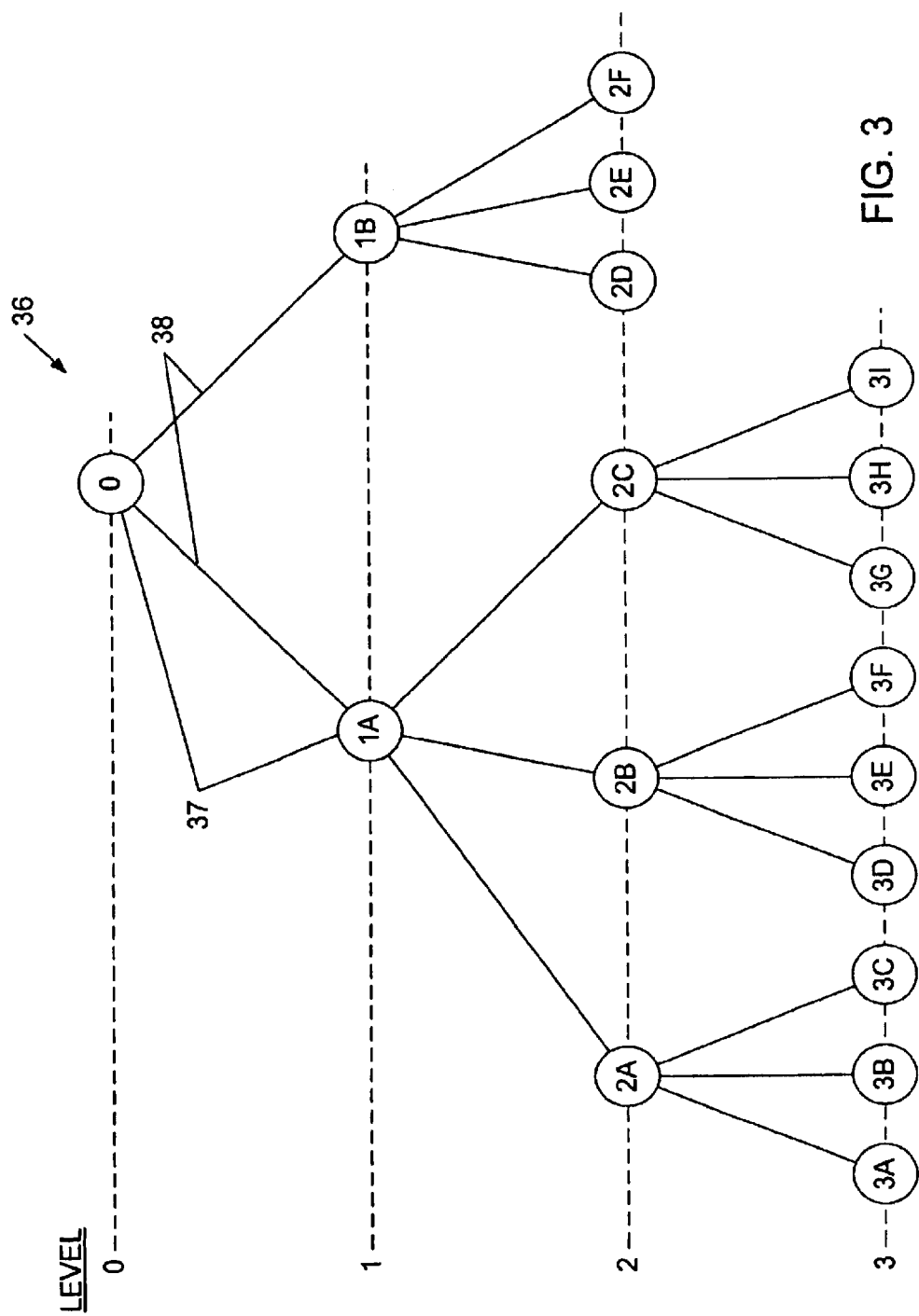
FIG. 3 is a diagram of an exemplary tree which may be used to represent hierarchical data.

Hierarchical entities may be represented using a tree structure or "tree". FIG. 3 is a diagram of an exemplary tree 36. Tree 36 includes members of a group and conveys the hierarchical relationships between the members. Tree 36 of FIG. 3 includes nodes 37 and branches 38. Nodes 37 represent the members of the group. Nodes 37 exist at different levels within tree 36. Each branch 38 interconnects two nodes 37 at different levels.

For example, tree 36 of FIG. 3 may be a representation of a file system accessed by processing system 30. The node labeled "0" in FIG. 3 may represent the root directory of the file system. The root directory may contain two subdirectories represented by nodes 1A and 1B at a level 1 in tree 36 below node 0. The subdirectory represented by node 1A may include three subdirectories represented by nodes 2A, 2B, and 2C at level 2 below node 1A. Nodes 3A, 3B, and 3C at level 3 below node 2A may represent either files or empty subdirectories with the subdirectory represented by node 2A.

Alternately, tree 36 may represent a hypertext markup language (HTML) document accessed by processing system 30. The HTML document may contain a table element and a list element. The node labeled "0" in FIG. 3 may represent the HTML document as a whole (e.g., a body element of the HTML document). Node 1A may represent the table element, and node 1B may represent the list element. Nodes 2A and 2B may respectively represent first and second row container elements of the table element, and node 2C may represent a header container element of the table element. Nodes 2D–2F may represent three different list entries of the list element. Nodes 3A–3C may each represent a different row entry of the first row container element, nodes 3D–3F may each represent a different row entry of the second row container element, and nodes 3G–3I may each represent a different header entry of the header container element.

It is noted that directories of file systems, folders of GUIs, elements of Web documents such as HTML and extensible markup language (XML) documents, and sections of maps organized as described above are all "containers" and may contain other containers and/or data (e.g., files, additional detail, etc.).

Processing system 30 may issue display signals to display terminal 16 to display elements represented by nodes in a pre-selected number of levels of a hierarchical entity simultaneously upon display screen 22. Each member of the displayed group which is a container may be displayed in such a manner as to indicate that additional containers and/or data may exist within the container. For example, directories of a file system, folders of a GUI, and elements of Web documents may be displayed using graphical symbols or icons which indicate that additional containers and/or data may exist within the container. As will be described in more detail below, the user may vary the number of levels of the hierarchical entity displayed simultaneously upon display screen 22 by altering the proximity of his or her face to opening 24 of camera 18.

Figure 4:
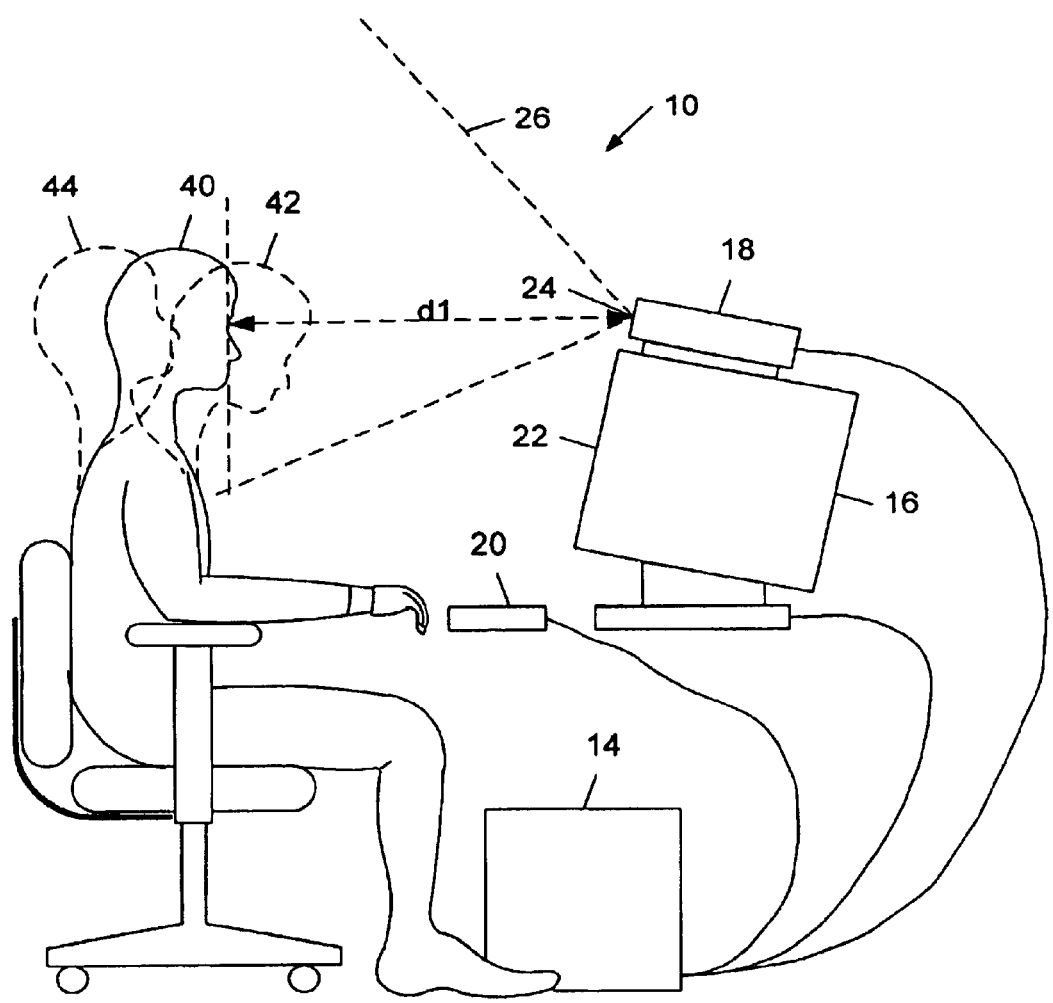
FIG. 4 is a side view of the user operating the computer system of FIG. 1, wherein a distance d1 exists between the user's face and a light gathering opening of the camera, and wherein distance d1 varies with the proximity of the user's face to the opening of the camera.

FIGS. 3 and 4 will now be used to further describe the operation of several different embodiments of computer system 10 of FIG. 1. FIG. 4 is a side view of the user operating computer system 10. As described above, during use of computer system 10, the user's eyes are typically directed toward display screen 22 of display terminal 16 in order to view information displayed upon display screen 22. As such, the user's face is oriented toward display screen 22. As described above, opening 24 of camera 18 is directed such that the user's face is within a field of view 26 of camera 18. Camera 18 converts light entering opening 24 from field of view 26, including light reflected from the user's face, into electrical image signals.

Camera 18 may include a two dimensional array of light sensors (e.g., charge coupled devices or CCDs). Camera 18 may periodically sample outputs of the light sensors in order to produce the electrical image signals. Display computation unit 32 of processing system 30 receives the periodic electrical image signals from camera 18 and processes the electrical image signals to form images. As the user's face is within field of view 26 of camera 18, the images formed by processing system 30 include the user's face and facial features. As will be described in more detail below, processing system 30 compares each formed image to an image formed when the user is in either a "normal" position or a previous position in order to determine the relative proximity of the user's face to opening 24 of camera 18.

As shown in FIG. 4, the user's face is at a distance "d1" from opening 24 of camera 18. When the user is in a normal upright sitting position 40 during use of computer system 10, a "normal" image may be recorded and used during later comparisons. A "normal" portion occupied by the user's face and/or a "normal" distance between the user's facial features may be extracted from the "normal" image and used during later comparisons. As the user's head is moved closer to opening 24 of camera 18 as represented by a forward position 42, the portion of the images occupied by the user's face (i.e., the size of the user's face in the images) increases, as do the distances between the user's facial features. As the user's head is moved farther from opening 24 of camera 18 as represented by a back position 44, the portion of the images occupied by the user's face (i.e., the size of the user's face in the images) decreases, as do the distances between the user's facial features.

Figure 5:
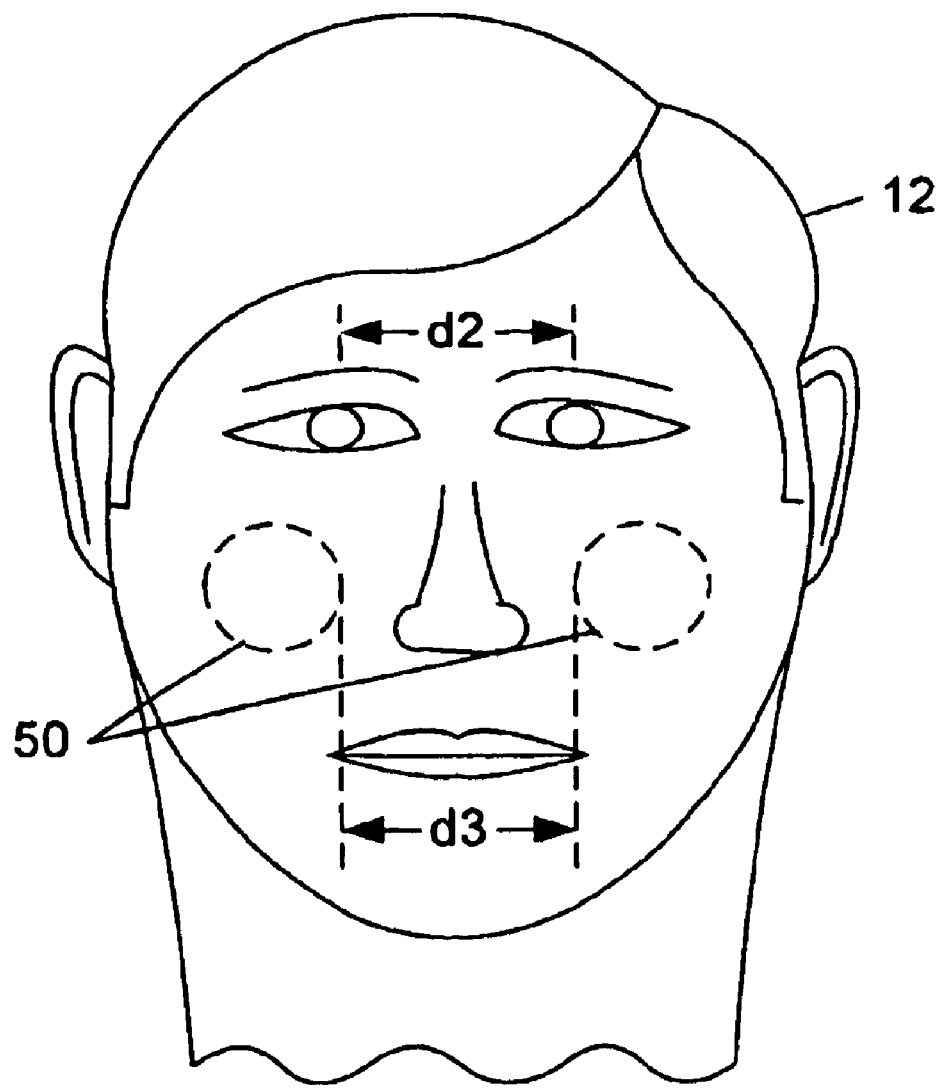
FIG. 5 is a representation of an exemplary user's face illustrating facial features which may be analyzed to determine the proximity of the user's face to the opening of the camera.

FIG. 5 is a representation of an exemplary user's face illustrating facial features which may be analyzed to determine the proximity of the user's face to opening 24 of camera 18. The pigmented irises of the eyes contrast sharply with the surrounding white portions, thus facilitating determinations of a distance "d2" between outer edges of the two irises across the bridge of the nose. Areas 50 over the cheek bones typically reflect a substantial amount of light and are easily distinguishable from surrounding facial areas, thus facilitating determinations of a distance "d3" between outer edges of the two areas 50 over the cheek bones. It is noted that distances between other facial features, such as ears or corners of the mouth, may also be used.

In some embodiments of computer system 10, the relative proximity of the user's face to opening 24 of camera 18, as determined by the portion of the images occupied by the user's face (i.e., the size of the user's face in the images) and/or the distances between the user's facial features, is used to present more or less of the information (i.e., detail) of a hierarchical structure in a hands free manner.

In a "discrete" or "relative to normal" method which may be embodied within computer system 10, the proximity of the user's face to opening 24 of camera 18 relative to a "normal" proximity may be used for navigation and/or "zooming." The user may, for example, cause processing system 30 to capture a "normal" image with the user in normal position 40. The user may, for example assume normal position 40 and activate input device 20 (e.g., by saying the word "go" to a speech-to-text converter, clicking a button of a mouse, or pressing a key on a keyboard), thus causing processing system 30 to capture the "normal" image. "Normal" values may also be extracted from the "normal" image as described above and used during later comparisons.

Alternately, processing system 30 may produce the "normal" image and/or values automatically. For example, it is noted a typical user does not move his or her head substantially when in normal position 40. Processing system 30 may form the "normal" image from one or more images obtained when processing system 30 senses relatively little movement of the user's head.

The user then selects a hierarchical entity (e.g., a file structure, a GUI, a Web document, or a map represented by tree 36). Such selection may be made using input device 20. As described above, processing system 30 may issue display signals to display terminal 16 to initially display elements represented by nodes in a pre-selected number of levels of the hierarchical entity simultaneously upon display screen 22. The pre-selected number of levels may depend, for example, on the display capabilities of display terminal 16. The user may be able to change the pre-selected number of levels (e.g., via input device 20). For example, processing system 30 may be configured to produce display signals to display elements represented by nodes in 3 levels of tree 36 simultaneously upon display screen 22—levels 0, 1, and 2. In this case, elements represented by nodes 0, 1A–1B, and 2A–2F are displayed upon display screen 22 when a hierarchical entity represented by tree 36 is selected.

The user may cause the number of displayed levels (e.g., the amount of displayed information or detail) to be increased by moving his or her head closer to opening 24 of camera 18 than in normal position 40 (e.g., to forward position 42 in FIG. 4). In other words, the user may cause the number of displayed levels to be increased by reducing distance d1 to a distance substantially less than the distance in normal position 40 (i.e., to a distance substantially less than a "normal" value of distance d1). As described above, processing system 30 may compare each formed image to an image formed when the user is in normal position 40 in order to determine the relative proximity of the user's face to opening 24 of camera 18.

When the user moves his or her head closer to opening 24 of camera 18 than in normal position 40, the portion of the current image occupied by the user's face is greater than the "normal" portion. Similarly, the distance between selected facial features of the user is increased over the "normal" distance. Processing system 30 may respond to the increased portions of the images occupied by the user's face and/or increased distance between the user's facial features by, for example, issuing display signals to display an additional level of tree 36 upon display screen 22. Where elements represented by nodes in levels 0, 1, and 2 were displayed, elements represented by nodes in level 3 may be added to the display such that elements represented by nodes in levels 0, 1, 2, and 3 are displayed.

The user may cause the number of displayed levels (e.g., the amount of displayed information or detail) to be decreased by moving his or her head farther away from opening 24 of camera 18 than in normal position 40 (e.g., to back position 44 in FIG. 4). In other words, the user may cause the number of displayed levels to be decreased by increasing distance d1 to a distance substantially greater than "normal" distance d1 in position 40.

When the user moves his or her head farther from opening 24 of camera 18 than in normal position 40, the portion of the current image occupied by the user's face is less than the "normal" portion. Similarly, the distance between selected facial features of the user is less than the "normal" distance. Processing system 30 may respond to the decreased portions of the images occupied by the user's face and/or decreased distance between the user's facial features by, for example, issuing display signals to display one less level of tree 36 upon display screen 22. Where elements represented by nodes in levels 0, 1, 2, and 3 were displayed, elements represented by nodes in level 3 may be eliminated from the display such that only elements represented by nodes in levels 0, 1, and 2 are displayed.

A "template" approach to determining relative proximity may be applied to the "discrete" method described above. A "normal" image of the user in normal position 40 is used to make multiple templates. In a first template, the size of the user's face and/or dimensions of the user's facial features is increased (e.g., using geometric modeling or magnification). In a second template, the size of the users face and/or the dimensions of the user's facial features is reduced. In order to determine the relative proximity of the user's face to opening 24 of camera 18, the current image is compared to the two templates. If the size of the user's face and/or the dimensions of the user's facial features more closely matches the corresponding portions of the first template, the user's face is determined to be closer to opening 24 of camera 18. On the other hand, if the size of the user's face and/or the dimensions of the user's facial features more closely matches the corresponding portions of the second template, the user's face is determined to be farther from opening 24 of camera 18.

In a "continuous" or "relative to previous" method which may be embodied within computer system 10, a current proximity of the user's face to opening 24 of camera 18 relative to a previous proximity is used to navigate the structure of the hierarchical entity. Processing system 30 compares each formed "current" image to an immediately preceding "previous" image in order to determine relative proximity of the user's face to opening 24 of camera 18.

When the user moves his or her head closer to opening 24 of camera 18 between sample times of the previous image and the current image, processing system 30 may respond to the increased portion of the current image occupied by the user's face and/or increased distance between the user's facial features by, for example, issuing display signals to display an additional level of tree 36 upon display screen 22. Where elements represented by nodes in levels 0, 1, and 2 were displayed, elements represented by nodes in level 3 may be added to the display such that elements represented by nodes in levels 0, 1, 2, and 3 are displayed. As a result, more information (i.e., detail) is displayed.

When the proximity of the user's face to opening 24 of camera 18 does not change substantially (i.e., distance d1 remains substantially constant) between the previous and current images, the portions of the previous and current images occupied by the user's face are substantially the same. Similarly, the distances between the user's facial features remain substantially unchanged from the previous image to the current image. Processing system 30 responds by continuing to display the currently displayed portion of the hierarchical entity (e.g., elements represented by nodes in the currently displayed levels). As a result, the amount of information (i.e., detail) displayed does not change.

When the user's head is moved substantially farther from opening 24 of camera 18 between the previous image and the current image, portions of the current image occupied by the user's face are substantially less than corresponding portions of the previous image. Similarly, distances between the user's facial features are substantially less than corresponding distances of the previous image. Processing system 30 responds by issuing display signals to display, for example, one less level of tree 36 upon display screen 22. Where elements represented by nodes in levels 0, 1, 2, and 3 were displayed, elements represented by nodes in level 3 may be eliminated from the display such that only elements represented by nodes in levels 0, 1, and 2 are displayed. As a result, less information (i.e., detail) is displayed.

The above described "template" approach to determining relative proximity may also be applied to the "continuous" method. In this case, each previous image of the user is used to make the first and second templates, wherein the size of the user's face and/or dimensions of the user's facial features is increased in the first template and reduced in the second. The current image is compared to the two templates as described above in order to determine the relative proximity of the user's face to opening 24 of camera 18.

Bit-Mapped Image Data

As described above, display data 34 may be a bit-mapped image data. A typical bit-mapped image file includes dots representing a two dimensional image. The dots may be arranged as rows and columns. The value of each dot may be represented by one or more binary digits (i.e., bits) of data.

As is typical, display screen 22 may be arranged as a two-dimensional array of picture elements (i.e., pixels). The sharpness or clarity of an image displayed upon display screen 22 depends upon the number of pixels display screen 22 can display simultaneously. For example, a typical super video graphics array (SVGA) display screen includes almost 800,000 pixels arranged as 768 horizontal rows and 1,024 vertical columns.

An image is typically displayed upon display screen 22 using a raster scan technique—pixel by pixel, row by row (i.e., line by line), from a top of the screen to a bottom of the screen. In order to facilitate the raster scan technique, processing system 30 may store the image in a special "frame buffer" memory structure. Within the frame buffer, the pixel data of the image may be arranged in the order it is to be provided to display terminal 16 (i.e., pixel by pixel and row by row). The image is typically recreated or "refreshed" many times each second to avoid flicker.

A portion of display screen 22, referred to hereinbelow as a "display area" of display screen 22, may be allocated for the display of a portion of display data 34. The display area includes a number of horizontal rows of pixels less than or equal to the total number of display screen 22, and a number of vertical columns less than or equal to the total number of vertical columns of display screen 22.

Display computation unit 32 uses the values of dots of display data 34 to create pixel data for display screen 22 in order to display the portion of display data 34 within the display area of display screen 22. Processing system 30 then provides the pixel data produced by display computation unit 32 to display terminal 16 as display signals.

A number of rows of dots within the portion of display data 34 may exceed a number of rows of the display area of display screen 22. In this case, display computation unit 32 may eliminate or combine dot values (i.e., image information) on a row basis within display data 34 when producing the pixel data. For example, display computation unit 32 may ignore (i.e., skip) whole rows of dot values within display data 34 when producing the pixel data. Display computation unit 32 may also combine (e.g., through an averaging technique) the dot values of adjacent rows in order to produce fewer rows of pixel data.

Similarly, a number of columns of dots within the portion of display data 34 may exceed a number of columns of the display area. Display computation unit 32 may eliminate or combine dot values (i.e., image information) on a column basis within display data 34 when producing the pixel data. For example, display computation unit 32 may ignore (i.e., skip) whole columns of dot values within display data 34 when producing the pixel data. Display computation unit 32 may also combine (e.g., through an averaging technique) the dot values of adjacent columns in order to produce fewer columns of pixel data.

When display computation unit 32 eliminates or combines dot values of rows and/or columns of display data 34 when producing pixel data, the amount of image data incorporated into the pixel data is less than the amount of image data present within display data 34. Details of relatively small features of an image represented by display data 34 may not be visible to the user viewing the portion of display data 34 displayed within the display area of display screen 22. The result of dot value elimination or combination is thus a decrease in a level of detail perceived by the user.

The number of rows of dots within the portion of display data 34 to be displayed may be less than the number of rows of the display area of display screen 22. In this case, display computation unit 32 may generate "intermediate" image information on a row basis of display data 34 when producing the pixel data. For example, display computation unit 32 may interpolate between rows of dot values within display data 34 in order to produce one or more rows of pixel data.

Similarly, the number of columns of dots within the portion of display data 34 to be displayed may be less than the number of columns of the display area. Display computation unit 32 may generate intermediate image information on a column basis of display data 34 when producing the pixel data. For example, display computation unit 32 may interpolate between columns of dot values within display data 34 in order to produce one or more columns of pixel data.

When display computation unit 32 generates intermediate image information on a row and/or column basis of display data 34 when producing the pixel data, all of the image data present within display data 34 is incorporated into the pixel data. However, details of relatively small features of an image represented by display data 34 may be more visible to the user viewing the portion of display data 34 displayed within the display area of display screen 22. The result of generating intermediate image data is thus an increase in the level of detail perceived by the user.

As will be described in more detail below, the size of the portion of the bit-mapped image selected for display depends upon the relative proximity of the user's face to opening 24 of camera 18. As described above, the amount of image information displayed and the level of detail are dependent upon the number of dots in the portion of the image file (i.e., the size of the portion of the bit-mapped image). Thus the amount of image information displayed and the level of detail are dependent upon the relative proximity of the user's face to opening 24 of camera 18.

In some embodiments of computer system 10, the relative proximity of the user's face to opening 24 of camera 18, as determined by the portion of the images occupied by the user's face and/or the distances between the user's facial features, is used to increase or decrease the size of a portion of a bit-mapped image displayed within an allocated display area of display screen 22. This method may be considered a hands free "zooming" method.

FIG. 6 is a diagram representing the hands free "zooming" method wherein display data 34 is a bit-mapped image file, and a portion 60 of display data 34 is selected for display within a display area 62 of display screen 22. The size of portion 60 is determined by the proximity of the user's face to opening 24 of camera 18. Levels of "magnification" and detail: (i) increase as the size of portion 60 of the bit-mapped image is reduced, and (ii) decrease as the size of portion 60 is increased.

The "discrete" or "relative to normal" method may be employed to accomplish hands free "zooming". The "normal" image and/or values may be captured in response to user input or automatically by processing system 30 as described above. The user then selects a bit-mapped image for display (e.g., an image represented by display data 34) as described above. Display area 62 of display screen 22 may be allocated for the display of display data 34 (e.g., by processing system 30). Processing system 30 issues display signals to display terminal 16 to display a pre-selected (e.g., default) portion of display data 34 within the display area of display screen 22. The default portion may be, for example, the entire display data 34. Display of the entire display data 34 represents a lowest level of "magnification" and detail.

The user may indicate a portion of the displayed portion of display data 34 to be viewed in greater detail (e.g., via input device 20). The size of a next displayed portion of display data 34 may be pre-selected fraction of the currently displayed portion (e.g., one quarter). The user selects a "zoom in" mode by moving his or her head substantially closer to opening 24 of camera 18 than in normal position 40 (e.g., to forward position 42 in FIG. 4). As described above, processing system 30 may compare the portion of the current image occupied by the user's face to the normal portion. Alternately, processing system 30 may compare the distance between selected facial features of the user in the current image to the normal distance. Processing system 30 may respond to the increased portion of the current image occupied by the user's face and/or increased distance between the user's facial features by issuing display signals to display terminal 16 to display the next displayed portion of display data 34 within the display area of display screen 22.

It is noted that the size of the portion of display data 34 displayed within the display area is reduced in the "zoom in" mode. As a result, a level of "magnification" is increased, as is a level of detail as described above.

To select a "zoom out" mode, the user moves his or her head farther away from opening 24 of camera 18 than in normal position 40 (e.g., to back position 44 in FIG. 4). In this case, the ratio of the size of the next displayed portion of display data 34 to the size of the currently displayed portion may be the reciprocal of the pre-selected fraction used in the "zoom in" mode. For example, wherein the pre-selected fraction used in the "zoom in" mode is one quarter, the size of the next displayed portion in the "zoom out" mode may be four times the size of the currently displayed portion. In response to the decreased portions of the images occupied by the user's face and/or decreased distances between the user's facial features as the user's head is moved away from opening 24 of camera 18, processing system 30 issues display signals to display terminal 16 to display the next displayed portion of display data 34 within the display area of display screen 22.

It is noted that the size of the portion of display data 34 displayed within the display area is increased in the "zoom out" mode. As a result, the level of "magnification" is reduced, as is the level of detail as described above.

The "continuous" or "relative to previous" method described above may also be employed to accomplish the hands free "zooming". The user indicates and selects a bit-mapped image for display (e.g., display data 34) as described above. Display area 62 of display screen 22 may again be allocated for the display of display data 34 (e.g., by processing system 30). Processing system 30 issues display signals to display terminal 16 to display a pre-selected (e.g., default) portion of display data 34 within the display area of display screen 22. The default portion may be, for example, the entire display data 34. Display of the entire display data 34 again represents a lowest level of "magnification" and detail.

Processing system 30 compares each formed current image to the previous image as described above in order to determine the relative proximity of the user's face to opening 24 of camera 18. The user activates the "zoom in" mode by moving his or her head substantially closer to opening 24 of camera 18 between the sample times of previous and current images. Processing system 30 responds to the increased portion of the current image occupied by the user's face and/or increased distance between the user's facial features by displaying a selected next displayed portion of display data 34 as described above, wherein the next displayed portion is smaller than the currently displayed portion. As a result, the levels of "magnification" and detail are increased as described above.

When the proximity of the user's face to opening 24 of camera 18 is substantially the same in the current and previous images, processing system 30 responds by continuing to display the currently displayed portion of display data 34. As a result, the levels of "magnification" and detail remain the same.

The user activates the "zoom out" mode by moving his or her head substantially farther from opening 24 of camera 18 between the sample times of the previous and current images. Processing system 30 responds to the decreased portion of the current image occupied by the user's face and/or decreased distance between the user's facial features by displaying a selected next displayed portion of display data 34 as described above, wherein the next displayed portion is larger than the currently displayed portion. As a result, the levels of "magnification" and detail are reduced as described above.

Continuous Data

Display data 34 may also be continuous data. Continuous data represents a three-dimensional space. Continuous data may be used, for example, to create a virtual three-dimensional (3-D) environment about the user. The user may move "forward" in the virtual 3-D environment by decreasing the proximity of the user's face to opening 24 in camera 18, and may move "backward" in the virtual 3-D environment by decreasing the proximity of the user's face to opening 24 in camera 18. Either the "discrete" or "continuous" methods described above may be employed.

Consecutive Data

Display data 34 may also be consecutive data. Consecutive data represents a 3-D space as multiple "slices" of the 3-D space arranged in parallel planes. Each "slice" may be a separate image. For example, magnetic resonance imaging (MRI) creates a 3-D representation of a portion of a human body by forming multiple parallel cross-sectional images. Direction of motion may be defined normal to the parallel image planes. The user may move "forward" through the images representing the 3-D space by decreasing the proximity of the user's face to opening 24 in camera 18, and may move "backward" through the images representing the 3-D space by decreasing the proximity of the user's face to opening 24 in camera 18. Again, either the "discrete" or "continuous" methods described above may be employed.

It will be appreciated by those skilled in the art having the benefit of this disclosure that this invention is believed to be a system and method for displaying data, wherein the display properties (size, etc.) or the specific subset of the data displayed is dependent upon the proximity of the user's face to a camera. The method of determining the proximity of the user's face is not limited to those described here, and include multi-camera methods such as "stereo," where proximity is computed using pixel disparity. It is intended that the following claims be interpreted to embrace all such modifications and changes and, accordingly, the specification and drawings are to be regarded in an illustrative rather than a restrictive sense.

What is claimed is:

1. A computer system, comprising:

a camera producing image signals representing a first image and a second image of a user's face, wherein the first image precedes the second image in time;

a display device; and a processing system coupled to receive the image signals wherein the processing system is configured to:

analyze the first and second images to determine the proximity of the user's face to the camera; and provide display data to the display device dependent upon the proximity of the user's face to the camera.

2. The computer system as recited in claim 1, wherein the processing system analyzes the first and second images by comparing a size of the user's face in the second image to the size of the user's face in the first image.

3. The computer system as recited in claim 3, wherein if the size of the user's face in the second image is greater than the size of the user's face in the first image, the user's face is closer to the camera.

4. The computer system as recited in claim 3, where the processing system is configured to provide more of the display data to the display device when the user's face is closer to the camera.

5. The computer system as recited in claim 2, wherein if the size of the user's face in the second image is less than the size of the user's face in the first image, the user's face is farther from the camera.

6. The computer system as recited in claim 5, where the processing system is configured to provide less of the display data to the display device when the user's face is farther from the camera.

7. The computer system as recited in claim 1, wherein the first image is an image of the user's face when the user is operating the computer system in a normal upright sitting position.

8. The computer system as recited in claim 7, where the processing system is configured to provide more of the display data to the display device when the user's face is closer to the camera.

9. The computer system as recited in claim 7, where the processing system is configured to provide less of the display data to the display device when the user's face is farther from the camera.

10. The computer system as recited in claim 1, wherein the first image immediately precedes the second image in time.

* * * * *

UNITED STATES PATENT AND TRADEMARK OFFICE
CERTIFICATE OF CORRECTION

PATENT NO. : 6,864,912 B1
DATED : March 8, 2005
INVENTOR(S) : Mahaffey et al.

It is certified that error appears in the above-identified patent and that said Letters Patent is hereby corrected as shown below:

Title page,
Item [74], *Attorney, Agent, or Firm*, after "Marilyn S. Dawkins" please insert
-- , IBM --.

Signed and Sealed this

Eighteenth Day of October, 2005

JON W. DUDAS
*Director of the United States Patent and Trademark Office*